US010843322B1

(12) United States Patent
Williams et al.

(10) Patent No.: US 10,843,322 B1
(45) Date of Patent: Nov. 24, 2020

(54) MULTI-TOOL FOR A TRACTOR TRAILER

(71) Applicants: Danny L. Williams, Lincoln, FL (US); Loretta B. Williams, Lincoln, FL (US)

(72) Inventors: Danny L. Williams, Lincoln, FL (US); Loretta B. Williams, Lincoln, FL (US)

( * ) Notice: Subject to any disclaimer, the term of this patent is extended or adjusted under 35 U.S.C. 154(b) by 91 days.

(21) Appl. No.: 15/684,527

(22) Filed: Aug. 23, 2017

Related U.S. Application Data

(60) Provisional application No. 62/378,281, filed on Aug. 23, 2017.

(51) Int. Cl.
| | |
|---|---|
| *B25F 1/00* | (2006.01) |
| *E05B 85/10* | (2014.01) |
| *B60R 11/06* | (2006.01) |
| *B60R 11/00* | (2006.01) |

(52) U.S. Cl.
CPC .............. *B25F 1/006* (2013.01); *B60R 11/06* (2013.01); *E05B 85/10* (2013.01); *B60R 2011/004* (2013.01); *B60R 2011/005* (2013.01)

(58) Field of Classification Search
CPC . B25F 1/006; B25F 1/00; B60R 11/06; B60R 2011/004; B60R 2011/005; E05B 85/10; B25D 1/00; B25D 1/04; B25G 1/08; B25C 11/00

USPC .......................................................... 81/20–27
See application file for complete search history.

(56) References Cited

U.S. PATENT DOCUMENTS

| | | | |
|---|---|---|---|
| 103,007 A | 5/1870 | Bibber | |
| 2,754,863 A * | 7/1956 | Yearley | .................... B25D 1/00 |
| | | | 81/22 |
| 3,644,951 A | 2/1972 | Colburn | |
| 3,843,981 A * | 10/1974 | Verest | .................... B25B 25/00 |
| | | | 254/131 |
| 3,901,297 A * | 8/1975 | Young | .................... B25G 3/20 |
| | | | 81/26 |
| 4,050,107 A | 9/1977 | Parma | |
| 5,201,559 A | 4/1993 | Boring et al. | |
| 5,326,144 A | 7/1994 | Forcier | |
| 5,344,201 A | 9/1994 | Offin | |
| 8,628,063 B1 * | 1/2014 | Stone | .................. E04G 17/0642 |
| | | | 140/123 |
| 2007/0096473 A1 | 5/2007 | Ortega | |
| 2013/0086845 A1 * | 4/2013 | High | ....................... B66F 15/00 |
| | | | 49/506 |

\* cited by examiner

*Primary Examiner* — David B. Thomas
*Assistant Examiner* — Thomas Raymond Rodgers
(74) *Attorney, Agent, or Firm* — Cramer Patent & Design, PLLC; Aaron R. Cramer

(57) ABSTRACT

A multi-tool includes a hollow heavy gauge tubular member having a king pin hook secured to an exterior first end a pair of hammer heads secured to an exterior second end opposite each other. A portion of the tube has a grip surface.

2 Claims, 6 Drawing Sheets

MULTI-TOOL FOR A TRACTOR TRAILER

RELATED APPLICATIONS

The present invention was first described in and claims the benefit of U.S. Provisional Application No. 62/378,281, filed Aug. 23, 2016, the entire disclosures of which are incorporated herein by reference.

FIELD OF THE INVENTION

A multi-tool includes a hollow heavy gauge tubular member having a king pin hook secured to an exterior first end a pair of hammer heads secured to an exterior second end opposite each other. A portion of the tube has a grip surface.

BACKGROUND OF THE INVENTION

There are countless tractor-trailer trucks that criss-cross our country every day. These large vehicles bring just about every object we touch in our daily lives to us. Such trucks receive almost daily constant use, and like any mechanical device become worn over time. Such wear leads to mechanical operating assemblies that while still operational, do not function in a smooth and effortless manner as when they were new. Examples of such assemblies include door locking mechanisms, king pin release handles, and jack operating levers. Often times all that is needed is just an additional amount of force or leverage to overcome friction. This forces the driver or operator to grab anything at hand including scraps of lumber, sections of pipe, or even rocks to force such mechanisms often with resulting damage to the mechanism and perhaps even injury to oneself. Accordingly, there exists a need for a means by which various mechanical assemblies on tractor trailer rigs can be operated in a safe manner. The development of the multi-purpose hand tool for truckers fulfills this need.

SUMMARY OF THE INVENTION

The inventor has recognized the aforementioned issues and inherent problems and observed that there is a lack in the prior art for a multi-tool.

It is therefore an object of the invention to provide a tool comprising a handle which comprises a first and second end and a first and second opening disposed within each respective end, a hammer head which is disposed about the handle first end, a partially flattened handle portion which is disposed upon a handle first side adjacent the handle second end having a longitudinal side extending away from the handle second end towards the handle first end and a hook disposed within the partially flattened handle portion. In a separate configuration, the first opening comprises a circle while the second opening comprises a stadium. In this configuration, the handle may be hollow.

The hook may comprise a "U"-shaped shaft which may in turn be five-eighths of an inch (⅝ in.) in diameter. The hook may also comprise a hook opening between a hook distal end and the partially flattened handle portion. The hook may be welded to the partially flattened handle portion. The second opening may be configured to accommodate objects which are no greater than five-eighths of an inch (⅝ in.) in depth or no greater than one-and-three-eighths inches (1⅜ in.) in width. The second opening is configured to removably slide over a door handle.

The first opening may be tubular and may have a diameter of one-and-one half inches (1½ in.). The first opening is configured to removably slide over a jack handle. The hammer head may weigh no less than three pounds (3 lbs.) and no more than four pounds (4 lbs.).

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | multipurpose hand tool |
| 15 | hammer head |
| 20 | main handle |
| 25 | upper end |
| 30 | lower end |
| 35 | partially flattened section |
| 40 | hook |
| 45 | lower opening |
| 50 | upper opening |
| 55 | trailer door handle |
| 60 | door |
| 65 | trailer |
| 70 | first travel path "$t_1$" |
| 75 | second travel path "$t_2$" |
| 80 | kingpin handle |
| 85 | fifth wheel hitch assembly |
| 90 | truck |
| 95 | third travel path "$t_3$" |
| 100 | trailer jack handle |
| 105 | trailer jack (dolly leg) |
| 110 | fourth travel path "$t_4$" |
| 115 | fifth travel path "$t_5$" |
| 120 | sixth travel path "$t_6$" |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 1:
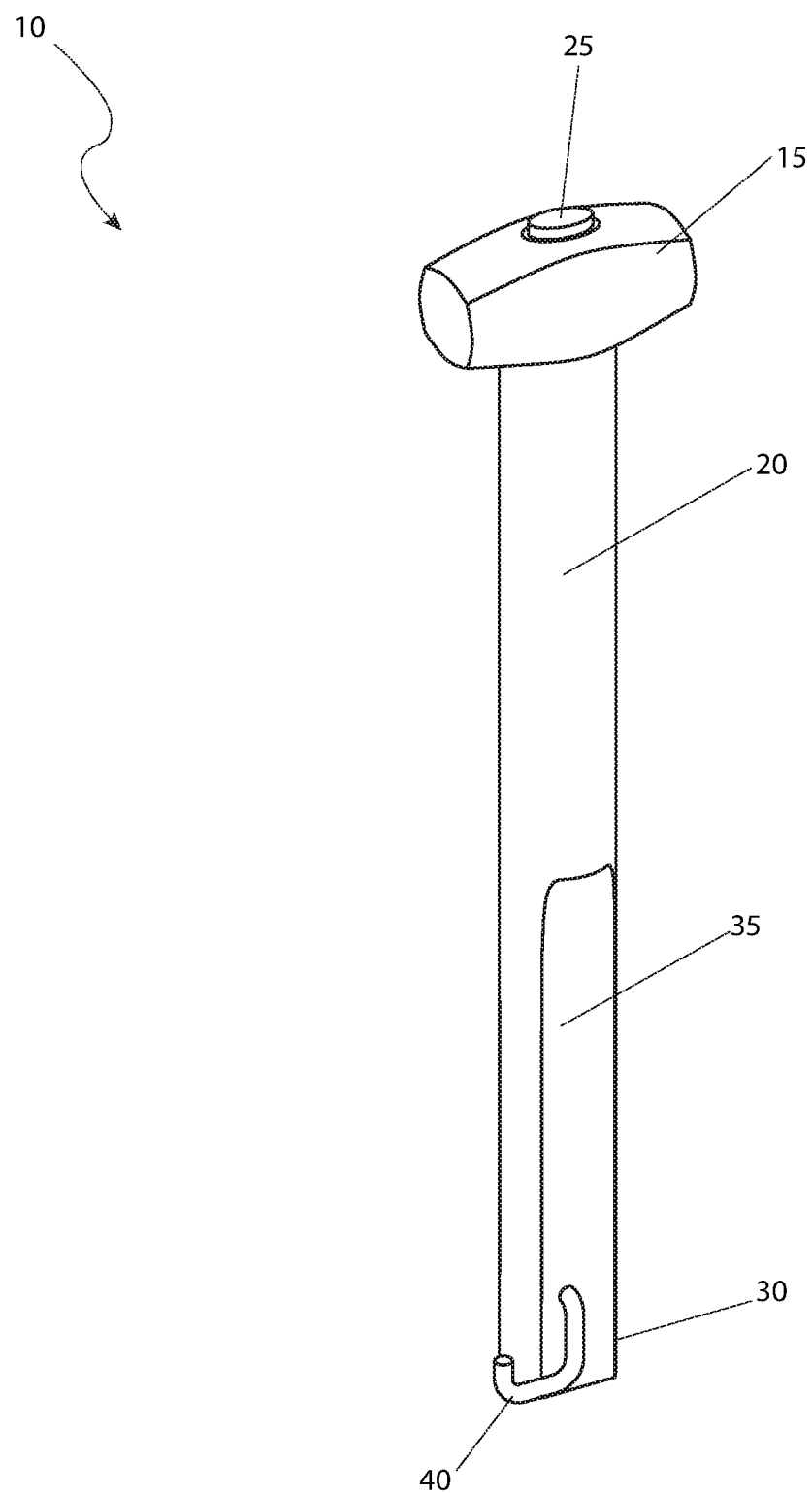
FIG. 1 is an isometric view of the multipurpose hand tool 10, according to the preferred embodiment of the present invention.

Referring now to FIG. 1, a front view of the multipurpose hand tool for truckers 10, according to the preferred embodiment of the present invention, is disclosed. The multipurpose hand tool (herein described as the "device") 10, comprises mainly of a hammer head 15 and a main handle 20. The hammer head 15 would be made of cast and machined steel using well known manufacturing processes and would weigh between three to four pounds (3-4 lbs.). The main handle 20 would be made of hollow steel using well known extrusion and stamping technologies. It would be approximately twenty to thirty inches (20-30 in.) in total length. The hollow nature of the main handle 20 allows additional functions to be performed by both an upper end 25 and a lower end 30. The proximal end of the main handle 20 is provided with a partially flattened section 35. The partially flattened section 35 is approximately five inches (5 in.) in total length. Further description on the design and function of the partially flattened section 35 will be provided herein below.

A hook 40 is provided at the bottom of the lower end 30. The hook 40 is made of a pre-formed "U"-shaped shaft that is approximately five-eighths of an inch (⅝ in.) in diameter. The hook 40 used to grab and pull objects out of normal reach of the user, or when additional pulling force is needed as aided by the hammer head 15. The opening between the hook 40 and the partially flattened section 35 is approximately three-quarters of an inch (¾ in.). The hook 40 is attached to the partially flattened section 35 by a welding process. Further description on the functionality of the hook 40 will be provided herein below.

Figure 2:
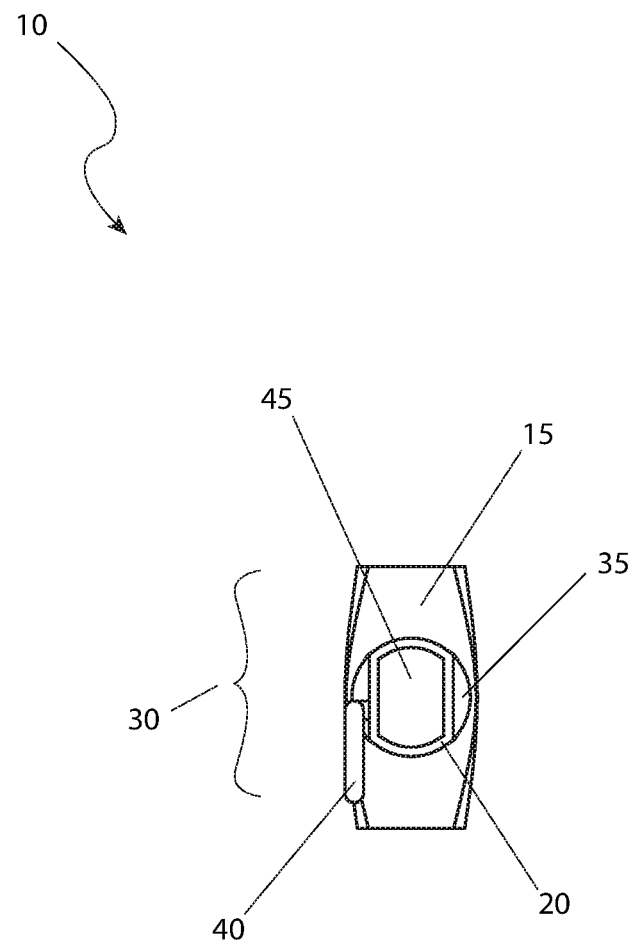
FIG. 2 is a top view of the multipurpose hand tool 10, according to the preferred embodiment of the present invention.

Referring next to FIG. 2, a top view of the device 10, according to the preferred embodiment of the present invention is depicted. Said view further affords learnings regarding the lower end 30 of the device 10. The hammer head 15 is visible at the distal end of the main handle 20, while the partially flattened section 35 is visible at the proximal end of the viewing position. As would be expected, the hook 40 is present at the side of the partially flattened section 35 to perform grabbing and pulling functions. A lower opening 45 is positioned centrally as shown within the confines of the partially flattened section 35 and may comprise a stadium shape defined generally as a rectangle having two (2) opposing curved ends. The lower opening 45 will accommodate linear objects up to approximately five-eighths of an inch (⅝ in.) in depth and up to one-and-three-eighths inches (1⅜ in.) in width. The expected use of the device 10 in such an application is to allow the lower opening 45 to be slid over the operating handles of a rear door mechanism on a trailer to provide additional leverage when operating and opening such handles. Further description on such usage will be provided herein below.

Figure 3:
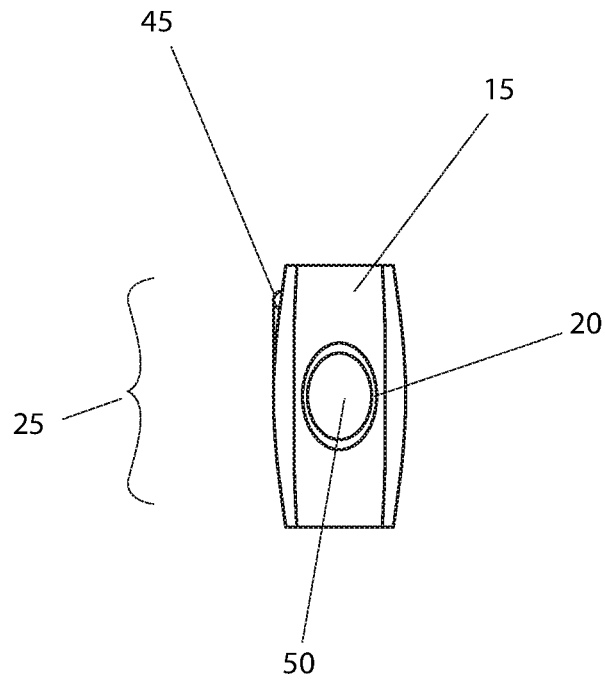
FIG. 3 is a bottom view of the multipurpose hand tool 10, according to the preferred embodiment of the present invention.

Referring now to FIG. 3, a bottom view of the device 10, according to the preferred embodiment of the present invention is shown. Said view further affords learnings regarding the upper end 25 of the device 10. The hammer head 15 is visible at the proximal end of the main handle 20. As would be expected, the hook 40 is present at the distal end of the main handle 20 on the partially flattened section 35 (not shown in this figure due to illustrative limitations) to perform grabbing and pulling functions. An upper opening 50 is positioned centrally as shown within the confines of the main handle 20. The upper opening 50 will accommodate cylindrical objects up to approximately one-and-one-half inches (1½ in.) in diameter. The expected use of the device 10 in such an application is to allow the upper opening 50 to be slid over the operating handles of a trailer jack mechanism (dolly leg) to provide additional leverage when operating and opening such handles. Further description on such usage will be provided herein below.

Figure 4:
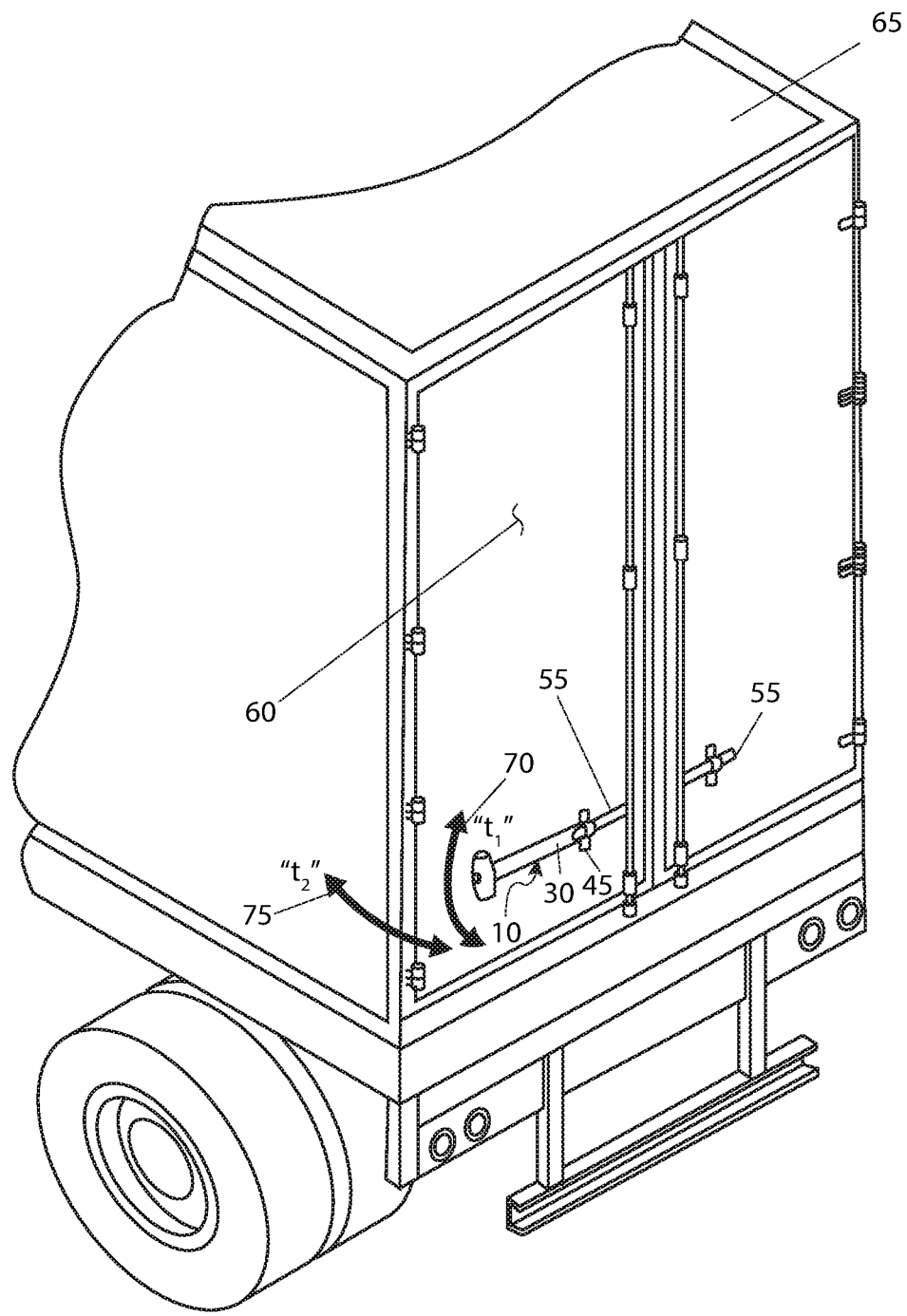
FIG. 4 is a perspective view of the multipurpose hand tool 10, shown in a utilized state upon a trailer door handle 55, according to the preferred embodiment of the present invention.

Referring next to FIG. 4, a perspective view of the device 10, shown in a utilized state upon a trailer door handle 55, according to the preferred embodiment of the present invention is disclosed. The trailer door handle 55, typically provided in pairs on a door 60 of a trailer 65, may become difficult to operate over time due to mechanical failure, lack of lubrication, environmental effects such as dust and dirt, weather effects such as ice and cold temperatures or any combination of the above. The lower opening 45 as provided on the lower end 30 is slid over the outwardly projecting end of the trailer door handle 55. The device 10 is then moved along a first travel path "$t_1$" 70 in an up and down motion and/or a second travel path "$t_2$" 75 in an in and out motion. Said assisted operation of the device 10 can occur when opening the door 60 or when closing the door 60. When finished with use, the device 10 is removed by sliding it off of the trailer door handle 55.

Figure 5:
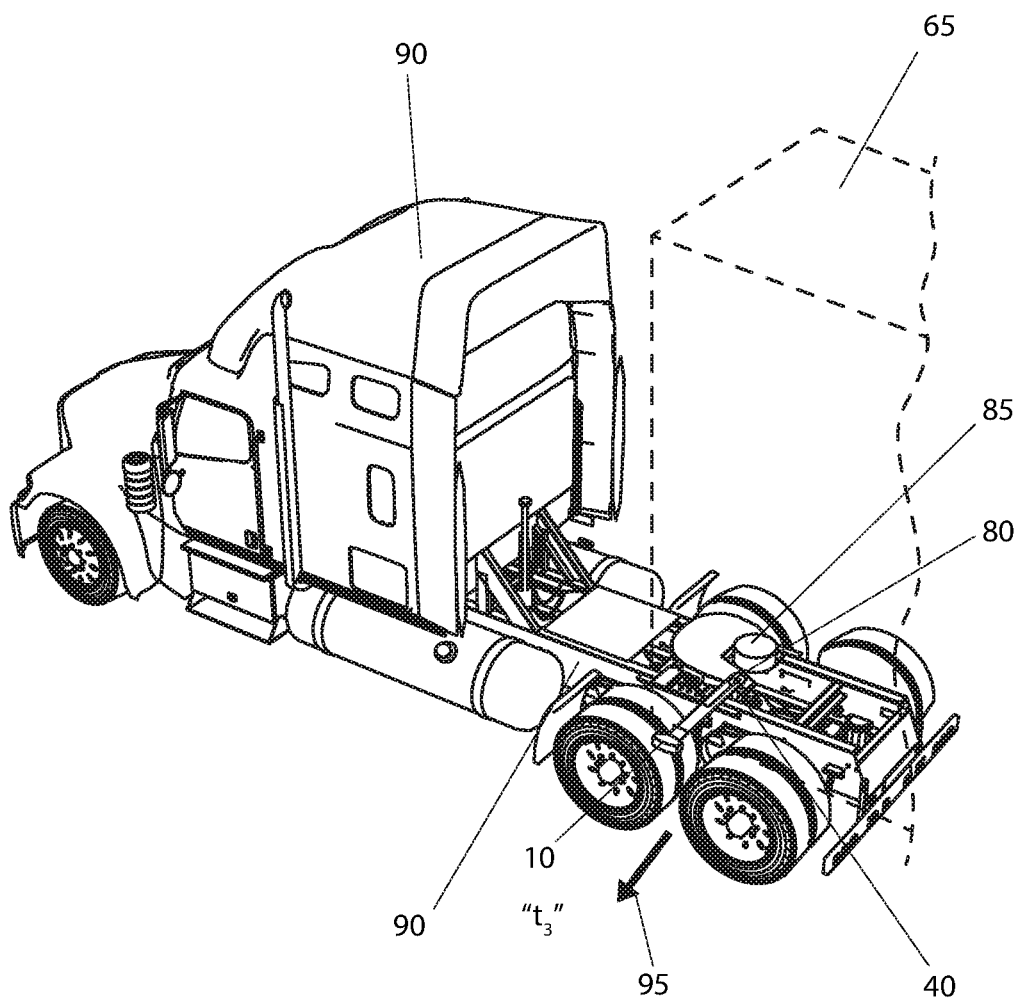
FIG. 5 is a perspective view of the multipurpose hand tool 10, shown in a utilized state upon a king pin handle 80, according to the preferred embodiment of the present invention; and, FIG. 6 is a perspective view of the multipurpose hand tool 10, shown in a utilized state upon a trailer jack handle 100, according to the preferred embodiment of the present invention.

Referring now to FIG. 5, a perspective view of the device 10, shown in a utilized state upon a king pin handle 80, according to the preferred embodiment of the present invention is depicted. The kingpin handle 80, provided as part of a fifth wheel hitch assembly 85, may become difficult to operate over time due to mechanical failure, lack of lubrication, environmental effects such as dust and dirt, weather effects such as ice and cold temperatures or any combination of the above. The kingpin handle 80 is a typical component on all types of truck(s) 90. The hook 40, as part of the device 10, is positioned over the kingpin handle 80 and moved along a third travel path "$t_3$" 95, thus moving the kingpin handle 80 and allowing the fifth wheel hitch assembly 85 to disengage the trailer 65 (here shown via phantom lines for illustrative clarity) from the truck(s) 90. When finished with use (once disengagement has occurred), the device 10 is simply lifted up and away from the kingpin handle 80.

Figure 6:
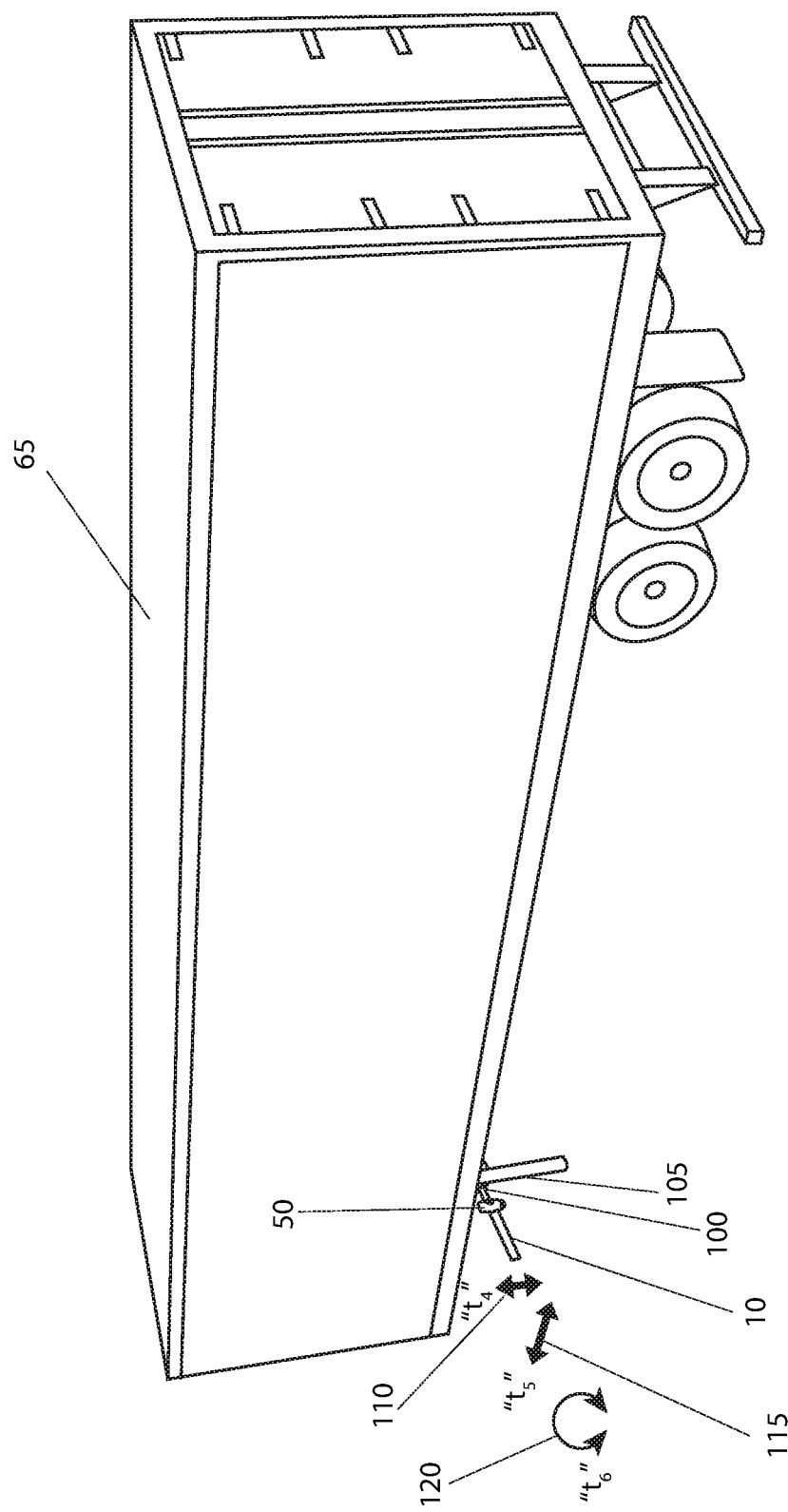

Referring finally to FIG. 6, a perspective view of the device 10, shown in a utilized state upon a trailer jack handle 100, according to the preferred embodiment of the present invention is shown. The trailer jack handle 100, provided as part of a trailer jack (dolly leg) 105, may become difficult to operate over time due to mechanical failure, lack of lubrication, environmental effects such as dust and dirt, weather effects such as ice and cold temperatures or any combination of the above. The trailer jack handle 100 is a typical component on all types of trailer 65. The upper opening 50, as part of the device 10, is positioned over the trailer jack handle 100 and moved along either a fourth travel path "t4" 110, a fifth travel path "t5" 115, or a sixth travel path "t6" 120, as required. Such motions would be applied in the necessary directions to either raise or lower the trailer jack (dolly leg) 105. When finished with use the device 10 is simply slid off of the trailer jack handle 100.

The preferred embodiment of the present invention can be utilized by the common user in a simple and effortless manner with little or no training. It is envisioned that the multipurpose hand tool for truckers 10 would be constructed in general accordance with FIG. 1-FIG. 3 and procured for use by a truck driver, operator, loading dock employee or similar user.

Actual use of the device 10 will occur in one (1) of four (4) ways. First, it can be used to assist in the opening and closing of trailer door handle 55 as shown in FIG. 4.

The lower opening 45 as provided on the lower end 30 off the device 10 is slid over the outwardly projecting end of the trailer door handle 55. The device 10 is then moved along a first travel path "$t_1$" 70 in an up and down motion and/or a second travel path "$t_2$" 75 in an in and out motion. This assisted operation of the device 10 can occur when opening the door 60 or when closing the door 60.

Second, the device 10 can be used to assist in the activation of the kingpin handle 80 as shown in FIG. 5. The hook 40, as part of the device 10, is positioned over the kingpin handle 80 and moved along a third travel path "$t_3$" 95, thus moving the kingpin handle 80 and allowing the fifth wheel hitch assembly 85 to disengage the trailer 65 from the truck(s) 90.

Third, the device 10 can be used to assist in the raising and lowering of the trailer jack (dolly leg) 105 as shown in FIG. 6. The upper opening 50, as part of the device 10, is positioned over the trailer jack handle 100 and moved along either a fourth travel path "$t_4$" 110, a fifth travel path "$t_5$" 115, or a sixth travel path "$t_6$" 120, as required. Such motions would be applied in the necessary directions to either raise or lower the trailer jack (dolly leg) 105.

Fourth, the device 10 can be used as a conventional hammer or sledgehammer to aid in the application and removal of tight handles, mechanisms, objects and other items as typically found on a truck(s) 90 and trailer 65 combination. When finished with use, the device 10 is stored with other tools until needed again in a cyclical manner.

The exact specifications, materials used, and method of use of the single-serve coffee systems may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A tool, comprising:
    a handle, comprising:
        a handle first end;
        a handle second end;
        a first opening disposed within said handle first end; and
        a second opening disposed with said handle second end;
    a hammer head disposed about said handle first end;
    a partially flattened handle portion disposed upon a handle first side adjacent said handle second end having a longitudinal side extending away from said handle second end towards said handle first end; and
    a hook disposed within said partially flattened handle portion;
    wherein said hook comprises a hook opening between a hook distal end and said partially flattened handle portion;
    wherein said hammer head weighs no less than three pounds and no more than four pounds;
    wherein said hook comprises a U-shaped shaft;
    wherein the handle is constructed of a tubular monolithic member from the first end to the second end, where the first end is generally cylindrical such that it is sized to receive a cylindrical object
    and wherein said hook is welded to said partially flattened handle portion.

2. A tool, comprising: a handle, comprising:
    a handle first end;
    a handle second end;
    a first opening disposed within said handle first end; and
    a second opening disposed with said handle second end;
    a hammer head disposed about said handle first end;
    a partially flattened handle portion disposed upon a handle first side adjacent said handle second end having a longitudinal side extending away from said handle second end towards said handle first end; and,
    a hook disposed within said partially flattened handle portion;
    and wherein said second opening comprises a stadium;
    wherein said hook comprises a hook opening between a hook distal end and said partially flattened handle portion;
    wherein said hammer head weighs no less than three pounds and no more than four pounds; wherein said hook comprises a U-shaped shaft;
    wherein the handle is constructed of a tubular monolithic member from the first end to the second end, where the first end is generally cylindrical such that it is sized to receive a cylindrical object
    and wherein said hook is welded to said partially flattened handle portion.

* * * * *